United States Patent Office.

JAMES E. SWAIN, OF BALTIMORE, MARYLAND, ASSIGNOR TO NICHOLAS S. HILL, OF SAME PLACE.

COMPOSITION FOR LEATHER-DRESSING.

SPECIFICATION forming part of Letters Patent No. 474,702, dated May 10, 1892.

Application filed September 24, 1891. Serial No. 406,722. (No specimens.)

*To all whom it may concern:*

Be it known that I, JAMES E. SWAIN, a citizen of the United States, residing at Baltimore, in the State of Maryland, have invented certain new and useful Improvements in Compositions for Leather-Dressing; and I do hereby declare the following to be a full, clear, and exact description of the invention, such as will enable others skilled in the art to which it appertains to make and use the same.

My present invention has reference to an improved composition for dressing leather and other like articles, the object being to provide an improved mixture which may be applied to leather harness, leather shoes, or any other kind of leather article, or to any similar article, so as to refresh its appearance, to renovate its condition, make it appear like and possess the qualities of new leather and blacken or otherwise color it, as may be desired—in fact, a composition which will impart to the leather all the qualities or characteristics for which leather-dressings are commonly employed.

The invention therefore consists in a composition for leather-dressing, consisting of the several ingredients substantially as hereinafter named, and also in a composition consisting of said ingredients united or commingled in the manner specified.

The invention also comprises all the various details relating to the carrying out of the process and the mixing and compounding of the composition, as well as the various ingredient elements and their equivalents united in the proportions stated or in equivalent proportions, all substantially as will be hereinafter described and claimed.

In making my improved composition for leather-dressing and similar purposes I first take shoemaker's wax. This wax commonly consists of tar, resin, and beeswax. There are two well-known kinds of this wax, commonly termed "black" wax and "yellow" wax. I preferably take a couple cakes of black wax and a couple cakes of yellow wax. These cakes are of the ordinary size. I am able to produce equally good results, however, by taking four cakes of black and none of yellow or four cakes of yellow and none of black. I reserve the liberty, therefore, of taking either one or both of these kinds and any desired amount. Shoemaker's wax is therefore the first ingredient of my composition, and to make an ordinary quantity thereof I take four of the ordinary sized cakes. This wax is placed in a vessel and heated over a slow fire for a convenient length of time—say about half an hour—until the wax is thoroughly melted and until the contents of the vessel have risen, say, about four inches. This description of the melting will give an idea to those skilled in the art as to how the shoemaker's wax needs to be prepared in the first step of the process of compounding the ingredients of my leather-dressing. Then the vessel containing the melted wax will be removed from the fire and a suitable amount of what is commonly termed "shoemaker's heel-wax"—say about three cakes—placed therein and allowed to dissolve in the melted wax. The whole mixture of wax, consisting now of the black, yellow, and heel wax, will soon cool, after which the vessel may be replaced upon the fire. I now add to the wax a suitable quantity of the grease preparation known as "dubbing"—say about three tablespoonfuls—and a suitable quantity of coloring-fluid—such as black shoemaker's ink, say about one gill. The contents of the vessel will now be heated over a slow fire for, say, an hour or more, until they are thoroughly dissolved, commingled, and combined and until they have risen within the vessel about fourteen inches or thereabout. I mention this feature of the rising of the contents during the process of dissolving and commingling so that an ordinary operator may have a tolerable idea of what will take place during the operations of my process.

I am not restricted to the use of black shoemaker's ink as a coloring ingredient. I may use copying or other ink or iodine or any other similar chemical which will produce the effect for which I use it. Finally I add a suitable amount of mutton-tallow—say for instance, a cake two inches square—allow the tallow to dissolve in the mixture, then remove the mixture from the fire and permit it to cool. Instead of mutton-tallow, any other equivalent tallow or other substance may be employed. The resulting composition will be found to be thick and viscous, and when applied to the leather by rubbing it thereon it will be readily absorbed by the leather, imparting thereto a bright, neat, new appearance, so that it will look like new leather. This leather-dressing may be applied to russet shoes, and when so applied will have the quality of transforming the surface of the leather of said shoes so that it will have the characteristics of the leather of ordinary black shoes, and may be readily blacked and polished by the use therewith of ordinary leather-blacking.

My improved leather-dressing is pre-eminently useful in connection with the leather of harness; but it may be employed for dressing any kind of leather or for dressing any other kind of similar articles with which it may be found useful in practice.

Having thus described my invention, what I claim as new, and desire to secure by Letters Patent, is—

1. The herein-described composition for leather-dressing, which consists of shoemaker's wax, shoemaker's heel-wax, dubbing, shoemaker's black ink, and mutton-tallow.

2. The herein-described composition for leather-dressing, consisting of shoemaker's wax and shoemaker's heel-wax in the proportion of four to three, dubbing, three tablespoonfuls shoemaker's ink for a coloring ingredient, one gill, and a suitable quantity of mutton-tallow.

In testimony whereof I affix my signature in presence of two witnesses.

JAMES E. SWAIN.

Witnesses:
JASPER M. BERRY, Jr.,
A. DORSEY JOHNSON.